June 30, 1931. A. A. KOHR 1,812,099
GAS PURIFICATION PROCESS AND APPARATUS
Filed July 13, 1925 2 Sheets-Sheet 1
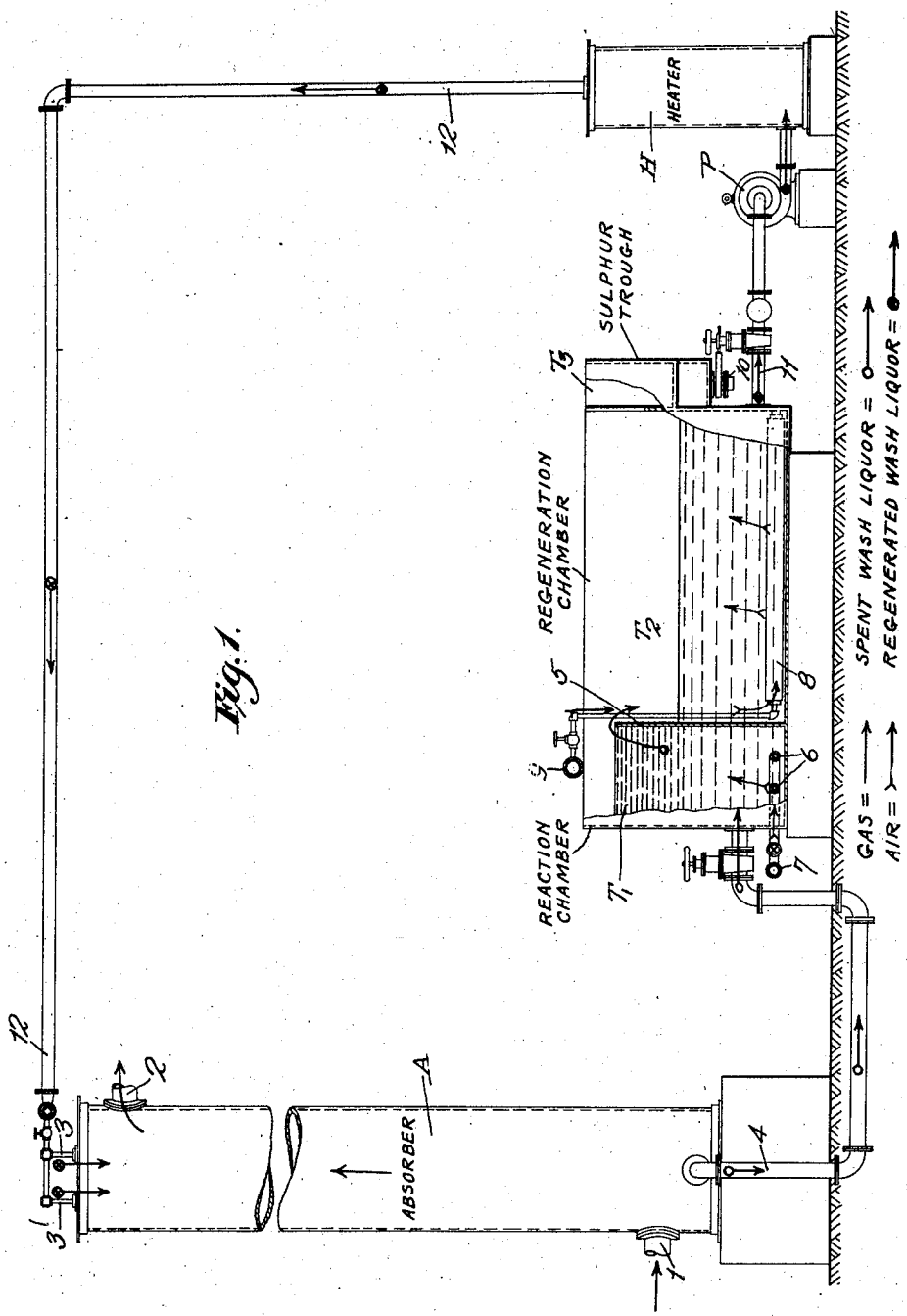
INVENTOR
Allison A. Kohr
BY
Munday, Clarke & Carpenter
ATTORNEYS

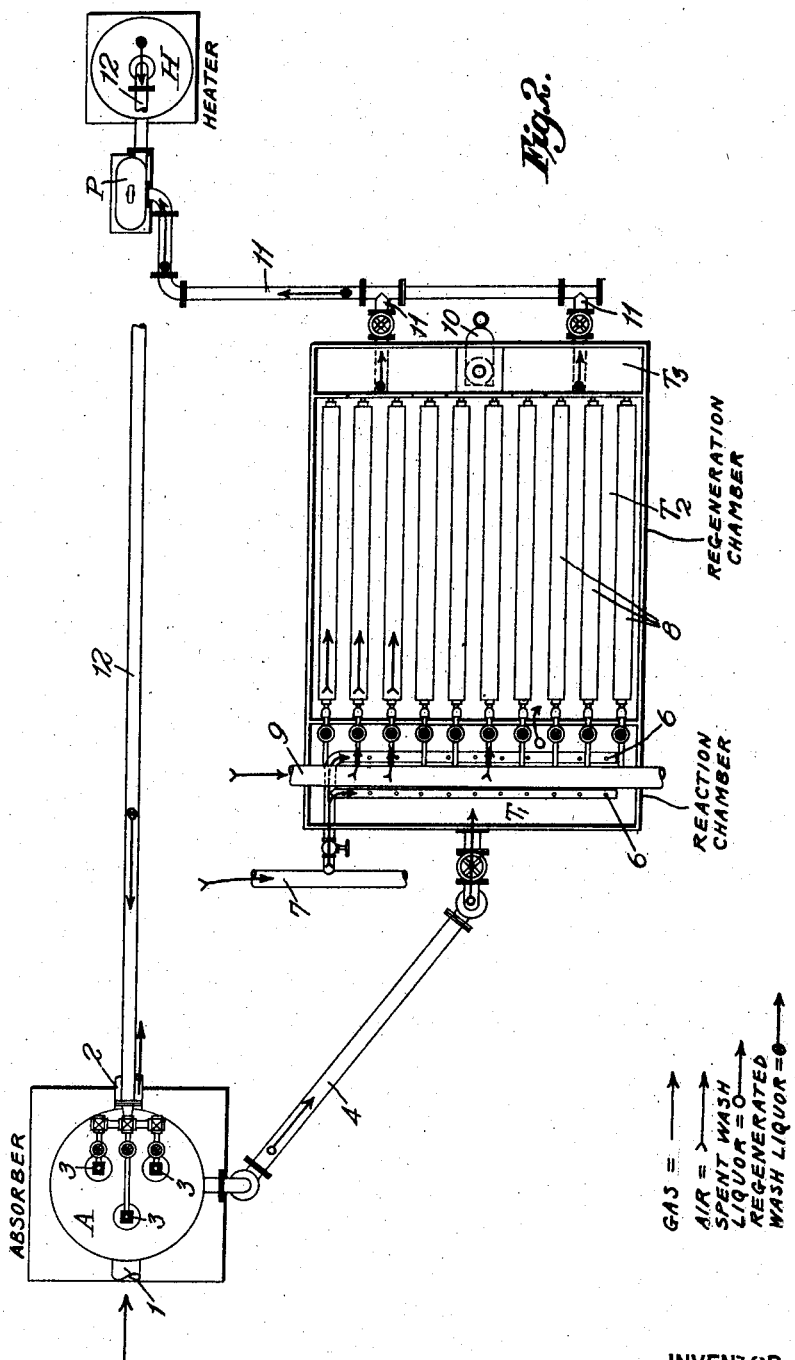

Patented June 30, 1931

1,812,099

UNITED STATES PATENT OFFICE

ALLISON A. KOHR, OF MAPLEWOOD, NEW JERSEY, ASSIGNOR TO THE KOPPERS COMPANY, OF PITTSBURGH, PENNSYLVANIA, A CORPORATION OF PENNSYLVANIA

GAS PURIFICATION PROCESS AND APPARATUS

Application filed July 13, 1925. Serial No. 43,347.

This invention relates to the purification of fuel gases, such as coal gas, water gas, and the like, from hydrogen sulphide and analogous impurities contained by such gases.

The invention has an important application to the practice of gas purification processes described and claimed in the prior copending applications of Gilbert E. Seil, Serial No. 21,978, filed April 9, 1925, Frederick W. Sperr, Serial Nos. 21,983 and 21,982, both filed April 9, 1925, and David L. Jacobson, Serial No. 520,786, filed December 8, 1921.

Broadly stated, such processes comprise the purification of fuel gases from hydrogen sulphide by subjecting the said gases to contact with an alkaline liquid absorbing medium wherein is suspended a finely divided compound of iron. A solution suspension that has given excellent results in practice comprises a one per cent suspension of ferric oxide in a three per cent solution of sodium carbonate. The solution-suspension absorbs the hydrogen sulphide from the gas on contact with the same, and is later subjected to aeration out of contact with the gas, whereby the sulphides present are oxidized to the original or other active compounds, with a separation of free sulphur. The sulphur is removed from the liquid, and the revivified solution-suspension is returned to the contact apparatus, where it is used once more to remove the impurities from unpurified gas. The process thus comprises a cycle of operation that includes an absorption phase and an actification phase.

The reactions which effect the removal of the hydrogen sulphide and the formation of free sulphur are essentially as follows:

In the absorber the hydrogen sulphide reacts with the sodium carbonate forming sodium hydrosulphide:

(1) $H_2S + Na_2CO_3 = NaHS + NaHCO_3$ 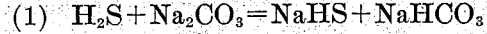

The sodium hydrosulphide reacts with ferric oxide and sodium bicarbonate:

(2) $3NaHS + Fe_2O_3 + 3NaHCO_3 =$
$3Na_2CO_3 + Fe_2S_3 + 3H_2O$ 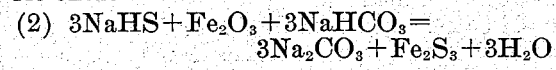

The reaction which occurs in the actification phase is essentially:

(3) $2Fe_2S_3 + 3O_2 = 2Fe_2O_3 + 6S$ 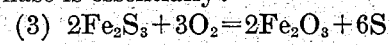

It has been common practice to pump the solution, immediately after contact with the gas, into an aerating chamber (called the thionizer) that is equipped with porous aerators of cloth or ceramic material, in tubular or flat configuration, whereby air in finely comminuted form is forced into the solution-suspension, with the resultant accomplishment of reaction (3). It will be seen that although there are three distinct steps in the chemical aspect of the cycle, the mechanical operation has been conducted in two, and the reaction (2) has been given such little consideration in this two-phase cycle that it is incomplete when aeration commences as the liquid reaches the thionizer. Unless the sulphur is totally, or practically so, in the form of an iron sulphide such as $Fe_2S_3$ when the liquid enters the thionizer, aeration will not be as effective as it should be by reason of the fact that some of the air that is intended to react with the ferric sulphide, is unable to do so because the latter has not yet been formed. The consequences of the incomplete reaction (2) are heightened in effect by the cost of forcing air through a diffusing medium such as the cloth mentioned. Moreover, under conditions when reaction (2) is incomplete as the solution-suspension enters the thionizer, this solution-suspension will contain undecomposed sodium hydrosulphide (NaHS) and under the influence of aeration the following reaction will occur:

$NaHS + NaHCO_3 = Na_2CO_3 + H_2S.$ 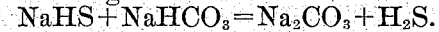

Thus, there is a possibility that some hydrogen sulphide will escape into the atmosphere, which is not desirable, and furthermore an equivalent amount of sulphur will be lost to the recovery process.

It has also been found by the applicant that the presence of the more soluble NaHS in the thionizer causes some stoppages in the porous diffusers, with resultant high back pressure and increased cost of aeration.

It appears moreover that reaction (2) occurs at a relatively slower rate than reactions (1) and (3). Consequently, I have provided by my invention means for effecting the completion of the relatively slower reaction (2) prior to the aeration stage.

Such means comprise a reaction tank situate in the line of travel of the liquid leaving the absorber, prior to the entry of the liquid into the thionizer or actifier; the function of the said reaction tank being substantially to effect a condition of reaction-equilibrium in the liquid before it is aerated to effect reaction (3). In order to further facilitate the completion of the desired reaction (2), means for agitating the liquid is provided within the said chamber. Mechanical agitation may be employed but it is usually preferable to agitate by means of a relatively small amount of air conducted through a perforated pipe. This air is not sufficiently comminuted to cause full oxidation of the $Fe_2S_3$, and the amount used is too small to cause formation of any appreciable amount of hydrogen sulphide.

The invention further consists in such other new and useful improvements, and has for further objects such other operative advantages or results, as may be found to obtain in the processes and apparatus hereinafter described or claimed.

In the accompanying drawings, forming a part of this specification and showing for purposes of exemplification certain form and manner in which the invention may be embodied and practiced, but without limiting the claimed invention to such illustrative instances:

Fig. 1 is an elevation partly in section of an installation of apparatus for carrying out the processes; and Fig. 2 is a plan view of the apparatus shown in Fig. 1.

The same characters of reference designate the same parts in each of the views of the drawings.

In its present embodiment, the invention is applied to the purification of fuel gases, such as coke oven gas from which tar and ammonia have been removed; for convenience, the present description will be confined to the above mentioned important application of the invention. The invention is, however, readily susceptible of other valuable applications; consequently, the invention is not confined in its scope to the specific use and embodiment herein described as an illustrative example.

In carrying out the invention as shown on the drawings, the gas to be purified enters the absorber tower A through the gas inlet pipe 1 and flows upward through the tower, passing out through the gas outlet pipe 2. During the travel of the gas through the tower A it comes into intimate contact with the preheated absorbent liquid that has been sprayed into the absorber through the sprays 3, which absorbent liquid is constituted of dissolved alkali, such as sodium carbonate, or other alkaline substances, and containing in suspension an iron compound, such as iron oxide, having an affinity for sulphur. The absorber A is filled with suitable contact means, such as the combination of distributive and contact devices described and claimed in the co-pending application of Frederick W. Sperr, Jr., Serial No. 21,980, filed April 9, 1925. The absorbent liquid, as it passes downward through the absorber, acquires by intimate contact with the gas all or the greater part of the sulphur content of the same, as is indicated in reaction (1) above. The spent liquid collects at the bottom of the absorber A and passes through the sealed outlet line 4 into the reaction tank $T_1$ and the flow into and out of said tank is continuous. The said reaction (2) compartment $T_1$ is separated from the thionizer compartment $T_2$ by the vertically disposed baffle 5, and said reaction (2) compartment is provided in its lower portion with perforated air pipes 6 that are supplied with air from the air line 7. The liquid is agitated by means of the air from said air pipes 6 during the time it remains in the reaction tank $T_1$, and the continuous flow into and out of said tank $T_1$ is such that the above mentioned reaction (2) is allowed to complete itself before the liquid overflows the baffle 5 into the thionizer $T_2$. The tank $T_1$ is of sufficient size to permit the reactions between the dissolved substances and the substances in suspension to come to substantial completion, i. e., to substantial reaction-equilibrium, before the solution-suspension overflows and enters the actification phase in the aerating or thionizer compartments. Within the latter, the liquid is forcibly aerated by means of finely comminuted air to effect more thorough and intimate contact with air, which air is introduced by means of the tubular aerators 8 placed therein, and fed by the air line 9, to effect reaction (3). Such aerators 8 may be of any convenient and suitable form, but a preferred form is the tubular pliable cloth described and claimed in the co-pending application of Gilbert E. Seil, Serial No. 21,978, filed April 9, 1925. The sulphur liberated by such aeration is allowed to rise to the surface, where it accumulates as a foam, which may be drawn off by means of the foam trough $T_3$, and treated for recovery of the sulphur or other constituents thereof. A quick acting gate valve 10 is provided for the removal of the foam from the foam trough $T_3$. The revivified solution-suspension passes out of the thionizer $T_2$ through the outlet pipes 11 to the pump P, which forces it through a heater H and the pipe 12 to the sprays 3 that distribute it to the absorber A. The cycle is thus begun once more.

The design of the thionizer may be subject to variations, for instance, it may be composed of a plurality of thionizers similar to the present illustrative example, and operated either in parallel or in series; or the reaction tank $T_1$ may be separated from the thionizer, although economic considerations in construction would indicate that it best be placed as shown; or the aeration in compartment $T_1$ may be accomplished in some other form of aeration device; or instead of locating this reaction tank $T_1$ in connection with the thionizer shown it might be located in connection with the absorber. The essential feature of the present invention is the interjection of a reaction chamber between the absorption and actification means.

As above stated, the liquid in passing through the said reaction compartment is allowed to rid itself of NaHS by completion of the reaction (2) hereinabove mentioned. By the provision of a separate compartment operating primarily for the purpose of effecting with certainty reaction (2), there is less chance of stoppages in the aerating system and the period in which the aerating tubes are kept in continuous service is lengthened, thereby reducing the cost of operation and upkeep.

The invention as hereinabove set forth or exemplified may be variously practiced or embodied within the scope of the claims hereinafter made.

I claim:—

1. In a process of purifying gases containing hydrogen sulphide, the combination of steps which consists in: washing the gas with an alkaline solution containing an iron compound having an affinity for sulphur; then passing the spent wash-liquor through a reaction phase to cause the iron compound to absorb substantially all of the sulphur remaining in alkaline solution; then passing the spent solution after such reaction through a regenerative phase in which the spent solution is subjected to the action of finely atomized air to effect thorough and intimate contact of air with the spent liquor; withdrawing the free sulphur that floats to the surface, and then heating and returning the regenerated solution to the gas washing phase.

2. In a process of liquid purification of gases involving an absorption phase, in which a preheated sodium carbonate solution containing iron oxide is brought into intimate and thorough contact with the gas to be purified to absorb the hydrogen-sulphide therefrom and to form iron sulphide, and involving an actification phase in which the spent solution is brought into intimate and thorough contact with finely atomized air to regenerate the iron sulphide to form iron oxide with liberation of free sulphur which floats to the surface, the improvement which consists in preliminarily agitating the spent liquor with air, before it reaches the actification phase, to cause the sulphur of the remaining sodium hydrosulphide to combine with the iron of the iron oxide for the formation of iron sulphide which, when aerated with finely atomized air in the actification phase, is more readily converted to iron oxide, adapted for further use in absorbing hydrogen sulphide from gases, and free sulphur without substantial formation of hydrogen-sulphide.

3. In a process of purifying gases containing hydrogen sulphide, the combination of steps which consists in: washing the gas with an alkaline solution containing an iron compound having an affinity for sulphur; then passing the spent wash-liquor through a reaction phase to cause the iron compound to absorb substantially all of the sulphur remaining in alkaline solution; then passing the spent solution after such reaction through a regenerative phase in which the spent solution is subjected to the action of finely atomized air to effect thorough and intimate contact of air with the spent liquor; withdrawing the free sulphur that floats to the surface, and then returning the regenerated solution to the gas washing phase.

4. In a process of purifying gases containing hydrogen sulphide, the combination of steps which consists in: washing the gas with an alkaline solution containing an iron compound having an affinity for sulphur; then passing the spent wash-liquor through a reaction phase to cause the iron compound to absorb substantially all of the sulphur remaining in alkaline solution; then passing the spent solution after such reaction through a regenerative phase in which the spent solution is subjected to the action of finely atomized air to effect thorough and intimate contact of air with the spent liquor; withdrawing the free sulphur, and then returning the regenerated solution to the gas washing phase.

5. In a gas purification process comprising a hydrogen-sulphide absorption-phase and an actification-phase wherein an alkaline solution containing a compound of a metal whose sulphide is insoluble is circulated to absorb the hydrogen-sulphide impurities in the absorption phase and the spent liquor is regenerated in the actification phase, the improvement comprising causing the reactions between the alkaline solution and the metal compound for the formation of metallic sulphide to come to substantial completion before the spent liquor enters the actification phase.

6. A process as claimed in claim 5 characterized by agitating the liquid undergoing substantial completion of reactions to facilitate the reaction between the alkaline solution and the metal compound.

7. In a process of purifying gases containing hydrogen sulphide, the combination of steps comprising: washing the gas with an alkaline solution containing a compound of a metal whose sulphide is insoluble; then passing the spent wash-liquor through a reaction phase to cause said compound of a metal to absorb substantially all of the sulphur remaining in alkaline solution; then passing the spent solution after such reaction through a regenerative phase in which the spent solution is subjected to the action of finely comminuted air to regenerate said metallic compound with liberation and flotation of free sulphur; withdrawing the free sulphur that floats to the surface; and then returning the regenerated solution to the gas washing phase.

8. In a proces of purifying gases containing hydrogen sulphide, the combination of steps comprising: washing the gas with an alkaline solution containing a compound of a metal whose sulphide is insoluble; then passing the spent wash-liquor through a reaction phase to cause said compound of a metal to absorb substantially all of the sulphur remaining in alkaline solution; then passing the spent solution after such reaction through a regeneration phase in which the spent solution is subjected to the action of finely comminuted air to regenerate said metallic compound with liberation of free sulphur; and then returning the regenerated solution to the gas washing phase.

9. Apparatus for regeneration of fouled liquid from a gas purification process comprising in combination: a reaction chamber; a regeneration chamber; said reaction chamber being adapted to occasion substantial completion of absorption reactions in fouled liquid and having liquid aerating means therein adapted for agitating liquid therein so as to effect an acceleration and completion of absorption reactions in the liquid with minimum regenerating action therein; said regeneration chamber being adapted to occasion regeneration of fouled liquid from said reaction chamber and having aerating means therein adapted for supplying finely comminuted gas to liquid therein so as to effect a relatively greater regenerating action therein; said reaction chamber and said regeneration chamber being constituted as compartments of the same tank and being so communicably connected with each other that liquid entering the reaction chamber traverses said chamber before passage into the regeneration chamber.

In testimony whereof I have hereunto set my hand.

ALLISON A. KOHR.